(12) United States Patent
Khalastchi et al.

(10) Patent No.: US 9,218,232 B2
(45) Date of Patent: Dec. 22, 2015

(54) ANOMALY DETECTION METHODS, DEVICES AND SYSTEMS

(75) Inventors: Eliahu Khalastchi, Petah Tigwa (IL); Gal Kaminka, Kfar Saba (IL); Raz Lin, Qiryat Ono (IL); Meir Kalech, Modiin (IL)

(73) Assignee: Bar-Ilan University, Ramat Gan (IL)

( * ) Notice: Subject to any disclaimer, the term of this patent is extended or adjusted under 35 U.S.C. 154(b) by 206 days.

(21) Appl. No.: 14/111,499

(22) PCT Filed: Apr. 12, 2012

(86) PCT No.: PCT/IB2012/051806
§ 371 (c)(1),
(2), (4) Date: Dec. 27, 2013

(87) PCT Pub. No.: WO2012/140601
PCT Pub. Date: Oct. 18, 2012

(65) Prior Publication Data
US 2014/0149806 A1     May 29, 2014

Related U.S. Application Data

(60) Provisional application No. 61/457,507, filed on Apr. 13, 2011.

(51) Int. Cl.
| G06F 11/00 | (2006.01) |
| G06F 11/07 | (2006.01) |
| G06F 11/34 | (2006.01) |
| G06K 9/00 | (2006.01) |

(52) U.S. Cl.
CPC .......... *G06F 11/0754* (2013.01); *G06F 11/008* (2013.01); *G06F 11/3466* (2013.01); *G06K 9/00496* (2013.01)

(58) Field of Classification Search
CPC   G06F 11/008; G06F 11/3466; G06F 2201/86
See application file for complete search history.

(56) References Cited

U.S. PATENT DOCUMENTS

| 5,586,066 | A | 12/1996 | White et al. |
| 7,386,030 | B2 | 6/2008 | Asghar et al. |
| 7,747,364 | B2 | 6/2010 | Roy et al. |
| 7,870,440 | B2 * | 1/2011 | Vacar et al. ................. 714/47.1 |
| 2009/0249129 | A1 * | 10/2009 | Femia ............................ 714/47 |
| 2011/0010099 | A1 | 1/2011 | Adourian et al. |
| 2012/0197911 | A1 * | 8/2012 | Banka et al. ................. 707/752 |

OTHER PUBLICATIONS

International Patent Application No. PCT/IB12/51806: International Search Report dated Sep. 7, 2012, 3 pages.

* cited by examiner

*Primary Examiner* — Charles Ehne
(74) *Attorney, Agent, or Firm* — Baker & Hostetler LLP (57) ABSTRACT

A method for detecting an anomaly in operation of a data analysis device, comprising: receiving present real-time readings of multiple sensors associated with the data analysis device, and maintaining a history of past real-time readings; determining which of said multiple sensors are correlated; computing a deviation between at least some of said present and at least some of said past real-time readings of said correlated sensors; and declaring an anomaly when said deviation exceeds a predetermined threshold.

12 Claims, 6 Drawing Sheets

Figure 1

$D_{mahal}(A) = 3.68$
$D_{mahal}(B) = 1.5$

ANOMALY DETECTION METHODS, DEVICES AND SYSTEMS

CROSS REFERENCE TO RELATED APPLICATIONS

This application is the National Stage of International Application No. PCT/IB2012/051806, filed Apr. 12, 2102, which claims the benefit of U.S. Application No. 61/457,507, filed Apr. 13, 2011, the disclosures of each of which are incorporated herein by reference in their entirety.

FIELD OF THE INVENTION

Aspects of the invention relate to methods, devices and systems for anomaly detection.

BACKGROUND OF THE INVENTION

The use of unmanned vehicles, autonomous robots and the like is appealing for tasks which are dangerous or dull, such as surveillance and patrolling [1], aerial search [9], rescue [2], mapping [19] and more. Manned vehicles may also benefit from partially-automatic operation, such as autopilots in aircraft and automatic parking systems in automobiles. However, increased reliance on such systems increases the reliance on their robustness. Even with validated software, physical faults in sensors and actuators can cause the controlling software to perceive the environment incorrectly, and thus to make decisions that lead to task failure.

This type of fault, where a sensor reading can appear valid, but be invalid given some operational or sensory context, is often referred to as contextual failure [4]. For instance, a sensor may get physically stuck, such that it no longer reports the true nature of its surroundings, but does report a value which is in the range of normally valid readings.

Autonomous robots operate in dynamic environments, where it is usually impossible to foresee, and impractical to account for all possible faults. Instead, the control systems of the robots are complemented by anomaly-detection systems, which can detect anomalies in the robot's systems, and trigger diagnosis (or alert a human operator). To be useful, such a system has to be computationally light (so that it does not create a computational load on the robot, which itself can cause failures), and detect faults with high degree of both precision and recall. A too-high rate of false positives will lead operators to ignoring the system; a too-low rate makes it ineffective. Moreover, the faults must be detected quickly after their occurrence, namely—in real time, so that they can be dealt with before they become catastrophic.

Anomaly detection has generated substantial research over past years. Applications include intrusion and fraud detection, medical applications, robot behavior novelty detection, etc. (see [4] for a comprehensive survey). Anomaly detection in Unmanned (also "Autonomous") Vehicles (UVs), specifically, is often characterized by a large amount of data from many sensors. The data are typically noisy and streamed online, and requires an anomaly to be discovered quickly, to prevent threats to the safety of the robot [4].

The large amount of data is produced from a large number of system components such as actuators, internal and external sensors, odometry and telemetry, that are each usually monitored at a high frequency. The separately-monitored components can be thought of as dimensions, and thus a collection of monitored readings, at a given point in time, can be considered a multidimensional point (e.g., [12, 15]). Therefore, methods that produce an anomaly score for each given point, can use calculations that consider the points' density, such as Mahalanobis Distance [12] or K-Nearest Neighbor (KNN) [15].

Statistical approaches to anomaly detection are usually considered when large amounts of data are available, and distributions can be calculated. These approaches usually assume that the data is generated from a particular distribution, which is not the case for high dimensional real data sets [4]. Laurikkala et al. [11] proposed the use of Mahalanobis Distance to reduce the multivariate observations to univariate scalars. Brotherton and Mackey [3] use the Mahalanobis Distance as the key factor for determining whether signals measured from an aircraft are of nominal or anomalous behavior. However, it appears that they are limited in the number of dimensions across which they can use the distance, due to run-time issues.

Apart from having to reduce dimensions when using Mahalanobis Distance, the dimensions that are left should be correlated. Recently, Lin et al. [12] demonstrated how using an offline mechanism as the Multi-Stream Dependency Detection (MSDD) [14] can assist in finding correlated attributes in the given data and enable use of Mahalanobis Distance as an anomaly detection procedure. The MSDD algorithm finds correlation between attributes based on their values. Based on the results of the MSDD process, Lin et al. manually defined the correlated attributes for their experiments. However, the main drawback of using the MSDD method is that it consumes many resources and is therefore used with offline training.

To distinguish the inherent noisy data from anomalies, Kalman filters are commonly applied (e.g., [8, 18, 5]). Since simple Kalman filters usually produce a large number of false positives, additional computation is used to determine an anomaly. For example, Cork and Walker [5] present a non-linear model, which, together with Kalman filters, tries to compensate for malfunctioning sensors of UAVs.

There is still a need in the art for online, light and reliable anomaly detection methods, and for devices, robots and the like which incorporate the same.

SUMMARY OF THE INVENTION

There is provided, in accordance with some embodiments, a method for detecting an anomaly in operation of a data analysis device, comprising: receiving present real-time readings of multiple sensors associated with the data analysis device, and maintaining a history of past real-time readings; determining which of said multiple sensors are correlated; computing a deviation between at least some of said present and at least some of said past real-time readings of said correlated sensors; and declaring an anomaly when said deviation exceeds a predetermined threshold.

In some embodiments, said deviation comprises a Mahalanobis distance.

In some embodiments, the method further comprises adjusting said predetermined threshold, to trade-off between anomaly detection rate and false positive anomaly declarations.

In some embodiments, said determining which of said multiple sensors are correlated comprises calculating a Pearson correlation between said present and said past real-time readings of said multiple sensors.

In some embodiments, the method further comprises adjusting a threshold of said Pearson correlation, to trade-off between anomaly detection rate and false positive anomaly declarations.

In some embodiments, the method further comprises applying a normalization function to said past real-time readings.

In some embodiments, said normalization function comprises a Z-transformation.

There is further provided, in accordance with some embodiments, a robot comprising multiple sensors, a processor and a memory, wherein said processor is configured to: receive present real-time readings from said multiple sensors, and maintain, in said memory, a history of past real-time readings; determine which of said multiple sensors are correlated; compute a deviation between at least some of said present and at least some of said past real-time readings of said correlated sensors; and declare an anomaly when said deviation exceeds a predetermined threshold.

There is further provided, in accordance with some embodiments, a data analysis device comprising multiple sensors, a processor and a memory, wherein said processor is configured to: receive present real-time readings from said multiple sensors, and maintain, in said memory, a history of past real-time readings; determine which of said multiple sensors are correlated; compute a deviation between at least some of said present and at least some of said past real-time readings of said correlated sensors; and declare an anomaly when said deviation exceeds a predetermined threshold.

In some embodiments, the robot further comprises a platform selected from the group consisting of: an unmanned aerial vehicle (UAV) and an unmanned ground vehicle (UGV).

In some embodiments, said deviation comprises a Mahalanobis distance.

In some embodiments, said processor is further configured to adjust said predetermined threshold, to trade-off between anomaly detection rate and false positive anomaly declarations.

In some embodiments, determine which of said multiple sensors are correlated comprises calculating, by said processor, a Pearson correlation between said present and said past real-time readings of said multiple sensors.

In some embodiments, said processor is further configured to adjust a threshold of said Pearson correlation, to trade-off between anomaly detection rate and false positive anomaly declarations.

In some embodiments, said processor is further configured to apply a normalization function to said past real-time readings.

In some embodiments, said normalization function comprises a Z-transformation.

There is further provided, in accordance with some embodiments, a method for online detection of an anomaly in operation of a data analysis device, the method comprising analyzing a behavior trend of multiple sensors of the device, and declaring an anomaly when a change of a predetermined magnitude in said behavior trend is detected.

There is further provided, in accordance with some embodiments, a robot comprising multiple sensors, a processor and a memory, wherein said processor is configured to analyze a behavior trend of multiple sensors of the robot, and declare an anomaly when a change of a predetermined magnitude in said behavior trend is detected.

There is further provided, in accordance with some embodiments, a data analysis device comprising multiple sensors, a processor and a memory, wherein said processor is configured to analyze a behavior trend of multiple sensors of the device, and declare an anomaly when a change of a predetermined magnitude in said behavior trend is detected.

In some embodiments, said analyzing of said behavior trend comprises computing a Mahalanobis distance between consecutive readings of said multiple sensors.

In some embodiments, said multiple sensors are correlated sensors selected from a larger plurality of sensors of the device or robot.

In some embodiments, the method further comprises calculating a Pearson correlation between consecutive readings of said larger plurality of sensors of the device, to select said correlated sensors.

In some embodiments, the method further comprises adjusting a threshold of said Pearson correlation, to trade-off between anomaly detection rate and false positive anomaly declarations.

In some embodiments, the robot further comprises a platform selected from the group consisting of: an unmanned aerial vehicle (UAV) and an unmanned ground vehicle (UGV).

In some embodiments, the data analysis device further comprises a platform selected from the group consisting of: a medical device, an intrusion detection system, a fraud detection system and an image processing system.

In some embodiments, said processor is further configured to calculate a Pearson correlation between consecutive readings of said larger plurality of sensors of the robot or data analysis device, to select said correlated sensors.

In some embodiments, said processor is further configured to adjust a threshold of said Pearson correlation, to trade-off between anomaly detection rate and false positive anomaly declarations.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Glossary

The term "data analysis device", as referred to herein, may relate to any device or system, whether having all its elements physically located at one location or being decentralized, which includes multiple data input devices and/or paths, such as sensors, actuators, incoming data originating from external systems, etc. These may be associated with and/or received by a control computer. The data analysis device may be aimed at and configured to sense and/or receive data, perform an analysis and optionally indicate the results; the nature (or "envelope") of the device may be referred as its "platform". Examples include:

1. a medical monitoring device having one or more sensors to sense patient and/or environmental parameters, and optionally one or more actuators to deliver a medical substance to the patient. For example, a pulse oximeter, an EEG, various heart rate and blood pressure monitors, etc., or a wearable or implantable medical device;
2. a computer intrusion detection system, configured to receive raw data and identify intrusion attempts hidden within the data;
3. a fraud detection system, configured to receive raw data, commonly of financial institutions, and identify criminal activities camouflaged as regular transactions;
4. a system used in the public health domain for identifying disease outbreaks or other public medical occurrences, by inspecting medical records;
5. a system for detecting industrial damage, such as damage to mechanical units, robots, or structural defects, by analyzing sensory data;
6. an image processing system for detecting changes, abnormalities or the like in still images or videos;
7. a text analysis system for detecting irregular events, news stories or the like in collections of news articles, RSS feeds or other documents;
8. a sensor network monitoring multiple parameters using multiple sensors, in which detection of sensor faults, intrusions or the like are needed;

Further data analysis devices will become apparent to those of skill in the art, for example by inspecting the examples and references in Chandola et al [4].

The control computer of the data analysis device may incorporate at least a central processing unit (CPU), a temporary, transient (volatile) memory such as Random Access Memory (RAM) and a computer-readable medium or article such as a non-transient (non-volatile) memory, all three jointly referred to herein as a "control computer". Non-transient memory stores a set of instructions that, when executed by CPU, cause the CPU to perform one or more methods, algorithms and/or operations in accordance with present embodiments, as laid out below. The computer-readable medium or article may include, for example, a read-only memory (ROM), flash memory, an electrically programmable read-only memory (EPROM), an electrically erasable and programmable read only memory (EEPROM), any type of disk including a floppy disk, an optical disk, CD-ROM, or any other type of media suitable for storing the present methods as computer instructions and capable of being coupled to a computer system bus. The instructions may include any suitable type of code, for example, source code, compiled code, interpreted code, executable code, static code, dynamic code and/or the like, and may be implemented using any suitable high-level, low-level, object-oriented, visual, compiled and/or interpreted programming language, such as C, C++, C#, Java, Fortran, Cobol, assembly language, machine code and/or the like.

Additionally or alternatively, the control computer may be wholly or partially substituted by a digital signal processor (DSP), a field-programmable gate array (FPGA) and/or an application-specific integrated circuit (ASIC), being configured to store and execute instructions of the present methods.

Unless specifically stated otherwise, it is appreciated that terms such as "processing", "computing", "calculating", "determining", "analyzing", "searching", "applying" or the like, which appear in discussions of present embodiments throughout the specification, refer to the action and/or process of a control computer or a similar electronic computing device that manipulates and/or transforms data represented as physical, such as electronic, quantities within the computing system's registers and/or memories into other data similarly represented as physical quantities within the computing system's memories, registers or other such.

The term "robot", as referred to herein, relates to a private case of a "data analysis device". A robot may be any electro-mechanical machine capable of performing one or more designated tasks by utilizing a control computer having at least a processor and a memory. A robot may include multiple sensors associated with the control computer. A robot may be autonomous, namely—operable in the field in a completely automatic manner, or semi-autonomous—such as be partially controlled by a human operator. In both cases, the robot may be manned or unmanned. The robot's "envelope", which characterizes its purpose and capabilities, may be referred to as its "platform". An example of a platform of an unmanned robot is an Unmanned Aerial Vehicle (UAV) used for aerial photography or military strikes. An example of a platform of a manned robot is passenger aircraft having an autopilot system. Although manned robots are often only semi-autonomous, also fully-autonomous manned robots are explicitly intended herein. Throughout this application, the term "data analysis device" is intended to also include "robot", while the use of the term "robot" alone means the private case of the robot.

The term "sensor", as referred to herein, may relate to any device capable of measuring a physical quantity and converting it to an electronic or electrical signal readable, finally, by the control computer of the data analysis device and/or any other associated computer. A discrete measurement of a physical quantity made by a sensor may be referred to as a "reading". A sensor may measure (also "sample", "read" or "monitor") the physical quantity at a certain frequency; additionally or alternatively, the control computer of the data analysis device may receive readings from the sensor at a certain frequency. A sensor may be regarded as "external" or "internal"; while an external sensor measures the outside environment or the data analysis device's state in relation to the outside environment, an internal sensor measures the operation of one or more internal components of the data analysis device. Examples of external sensors may include a sonar, a camera, a rangefinder, a barometer, a gyroscope, a GPS receiver, a compasses etc. Examples of internal sensors may include a motor RPM (revolutions per minute) meter, an engine temperature meter etc.

The term "actuator", for purposes of present discussions, relates to a private case of "sensor". An actuator is defined herein as an electro-mechanical or another device being controllable by a control computer of a data analysis device, sometimes a robot, in order to perform various physical actions, optionally such actions which affect the robot's state in relation to the environment. For example, an actuator in a UAV may be its throttle, which is controllable in order to accelerate and decelerate the UAV's flight. In an Unmanned Ground Vehicle (UGV), an actuator may be a motor which activates its breaks or a motor which controls steering. Naturally, the robot's control computer is knowledgeable about the actuators' state, or at least about the state they were ordered to be in by the previous control command transmitted to them from the computer. Accordingly, the knowledge of the control computer as to an actuator is analogous to a sensor reading, and may be referred to here as an actuator "state" or even "reading". Throughout this application, the term "sensor" is intended to also include "actuator", while the use of the term "actuator" alone means the private case of the actuator.

The term "attribute", as referred to herein, may relate to the type of physical quantity measured by a sensor, or, in the private case of the actuator—the physical quantity of the action being applied by that actuator. As a simplified example, in an aircraft, "altitude" is the attribute measured by the aircraft's barometer, and "ailerons" is the attribute pertaining to the right or left position of the aircraft's control column, which determines the ailerons state. In some scenarios, a certain attribute may be measured by more than one sensor, such as a barometer and a GPS receiver both providing an altitude indication. In such scenarios, the term "attribute" may refer to the sensors jointly or severally—as indicated or implied in place.

DESCRIPTION OF EMBODIMENTS

An aspect of some embodiments relates to anomaly detection methods for data analysis devices. The methods are lightweight and are suitable for online operation and for handling a large number of monitored sensors and internal measurements with high precision.

Advantageously, in accordance with some embodiments, anomaly detection in data analysis devices, such as robots, is improved by considering not merely the raw sensor readings, but their differential over time; robots, as an example, act in the same environment in which they sense, and their actions are expected to bring about changes to the sensed environment. Hence, unsensible differences in sensor readings suggest sensor malfunction.

Furthermore, in accordance with some embodiments, online use of the Mahalanobis distance—a statistical measure of distance between a sample point and a multi-dimensional distribution—is made, advantageously, to detect anomalies. As previous work has shown [12], use of the Mahalanobis distance with high-dimensional sensor data produced by robots is far from being trivial, and may require, for example, determining correlated dimensions. Here, a Pearson correlation measure or a different statistical correlation tool may be utilized to achieve this end. This calculation is both light and fast and can therefore be used online, even on computationally-weak robots and other data analysis devices.

After an anomaly is detected and declared, the pertinent platform may issue an alert, such as an audible or a visual one, and/or optionally transmit a notification of the anomaly to a remote location. Furthermore, the control computer may begin a diagnosis process, to isolate the source of the anomaly, which may lie in a defective sensor, faulty actuator or even an external factor. Then, the control computer may take measures to prevent damage to the platform or to its task, such as by ignoring a defective sensor, alerting a human etc. An action or a set of actions may be pre-programmed to be triggered upon a specific type of anomaly.

To increase the confidence that the anomaly is real and not occasional, one or more filters may be applied at the interface between the anomaly declarations and the diagnosis process or damage prevention measures. For example, a filter may cause the diagnosis process to begin only if a certain anomaly has repeated itself for more than X seconds or Y times.

Experiments of these methods have been performed in three different domains: Actual flight data from commercial Unmanned Aerial Vehicles (UAVs), in which simulated faults were injected by the manufacturer; data from RobotsandRelax, Inc.'s RV-400 vacuum cleaning robot; and the Flightgear flight simulator, which is widely used for research [10, 16, 7]. Multiple algorithms have been experimented with, to demonstrate the benefits of the present online use of the Mahalanobis distance. The experiments also showed that even the mere use of the differential sensor readings instead of raw readings may bring about significant improvement to existing algorithms. For reasons of simplicity, much of the discussions below refer to "robots"; however, unless specified otherwise, they are intended to relate and apply to any data analysis device.

To lay out the problem of online anomaly detection formally, let $A=\{a_1, \ldots, a_n\}$ be a set of attributes monitored by a robot's sensors. Monitored attributes (also "data") may be collected by internal and/or external sensors. The data is sampled and/or received at the robot's control computer at a frequency of every t milliseconds. Accordingly, the data is repeatedly given online as an input vector $\vec{i}_t=\{i_{t,1}, \ldots, i_{t,n}\}$ where $i_{t,j} \in \mathbb{R}$ denotes the value of attribute aj at current time t. With each $\vec{i}_t$ given, a decision needs to be made instantly whether or not $\vec{i}_t$ is anomalous. Past data H (optionally assumed to be nominal, namely—without anomalies) is also accessible. H is an m×n matrix where the columns denote the n monitored attributes and the rows maintain the values of these attributes over m time steps. H may be recorded from a previous operation of the robot that is known to be nominal (for example, a UAV flight with no known failures), or, advantageously, it may be created during present operation of the robot from the last m inputs that were given online, that is, $H=\{\vec{i}_{t-m}, \ldots, \vec{i}_{t-1}\}$.

The problem may be demonstrated using the following example: A UAV, which serves here merely as one example of many, collects and monitors n attributes, such as airspeed, heading, altitude, roll, pitch, yaw and/or other telemetry/sensory data. The sensors provide input at a given frequency (for example at 10 Hz), when suddenly a fault occurs; for instance, the altimeter is stuck on a valid value, while the GPS indicates that the altitude keeps on rising. Another example may be that the UAV sends a control signal to its ailerons to change their position, but the ailerons are not responsive due to icy wings. This is expressed, sensor-wise, in the unchanging values of the roll and heading. The goal is to detect these failures, by flagging them as anomalies. Then, the UAV may attempt to diagnose the anomalies and attempt to overcome them, to ensure a safe continuation of the flight.

Figures 1, 2, 3A, 3B, 3C:
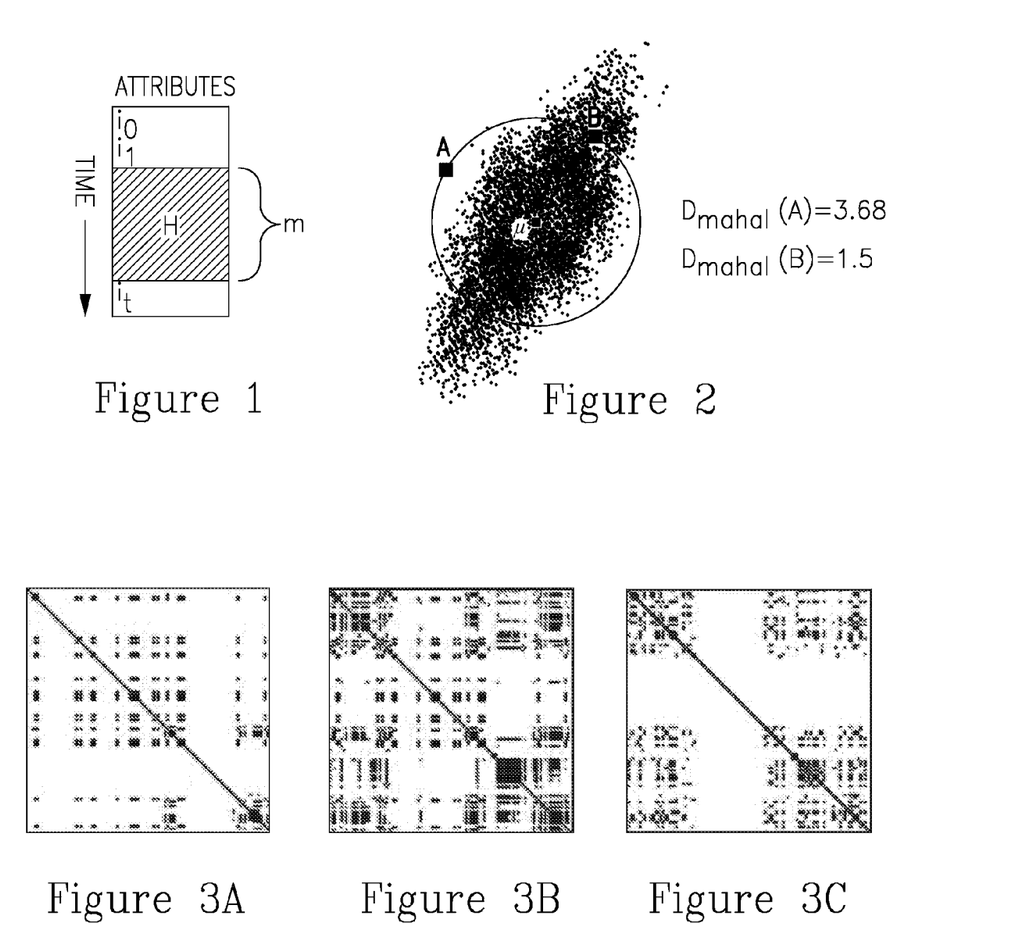
FIG. 1 shows a sliding window governing the length of historical data.
FIG. 2 shows a dense group of points of an observation, and exemplary Euclidean and Mahalanobis distances.
FIGS. 3A, 3B and 3C show visualizations of a correlation matrix, were each cell depicts the correlation strength between attributes.

A sliding window technique [4] may be used to maintain H, the data history, online. H may be maintained in a transitory (such as Random Access Memory—RAM) or non-transitory (such as solid-state or magnetic hard drive) of the robot. The sliding window, illustrated in see FIG. 1, is a dynamic window of a predefined size m which governs the length of history taken into account in the present methods. Thus, every time a new input $\vec{i}_t$ is received, H is updated as $H \leftarrow \{\vec{i}_{t-m-1}, \ldots, \vec{i}_{t-1}\}$ the last m online inputs. The data in H is optionally assumed to be nominal, and is used in the online training process. Based on H, the anomaly score for the current input $\vec{i}_t$ is evaluated, optionally using a Mahalanobis Distance [13].

Mahalanobis Distance is usually defined as an n-dimensional Z-score. It calculates the distance between an n-dimensional point to a group of others, in units of standard deviation [13]. In contrast to the common n-dimensional Euclidean Distance, Mahalanobis Distance also considers the distribution of the points. Therefore, if a group of points represents an observation, then the Mahalanobis Distance indicates to what extent a new point is an outlier compared to the observation. A point with values similar to the observed points will be located in the multidimensional space within a dense area and will have a lower Mahalanobis Distance. However, an outlier will be located outside the dense area and will have a larger Mahalanobis Distance. An example is depicted in FIG. 2. As seen in the figure, while points A and B have the same Euclidean distance from μ, the centroid, A's Mahalanobis Distance (3.68) is greater than B's (1.5), because an instance of B is more probable than an instance of A with respect to the other points.

Thanks to the nature of the Mahalanobis Distance, it may be utilized, according to present embodiments, for anomaly detection. Each of the n attributes sensed constitutes a dimension. An input vector $\vec{i}_t$ is the n-dimensional point, which is measured by Mahalanobis Distance against H. The Mahalanobis Distance is then used to indicate whether each new input point $\vec{i}_t$ is an outlier with respect to H, wherein an outlier is defined by a predetermined threshold.

Using the Mahalanobis Distance, at least the three common categories of anomalies [4] may be detected:
1. Point anomalies: illegal data instances, corresponding to illegal values in 4.
2. Contextual anomalies, that is, data instances that are only illegal with respect to specific context but not otherwise. In present embodiments, the context is provided by the changing data of the sliding window.
3. Collective anomalies, which are related data instances that are legal apart, but illegal when occurring together. This is met with the multi-dimensionality of the points being measured by the Mahalanobis Distance.

An anomaly of any type may cause the representative point to be apart from the nominal points, in the relating dimension, thus placing it outside of a dense area, and leading to a large Mahalanobis Distance and eventually causing an anomaly declaration.

Formally, the Mahalanobis Distance may be calculated as follows. As discussed above, $\vec{i}_t = \{i_{t,1}, \ldots, i_{t,n}\}$ is the vector of the current input of the n attributes being monitored, and H=m×n matrix is the group of the nominal values of these attributes. The mean of H may then be defined by $\mu = (\mu_1, \mu_2, \ldots, \mu_n)$, and S is the covariance matrix of H. The Mahalanobis Distance, $D_{mahal}$, from $\vec{i}_t$ to H is defined as:

$$D_{mahal}(\vec{i}_t, H) = \sqrt{(\vec{i}_t - \vec{\mu}) S^{-1} (\vec{i}_t - \vec{\mu}^T)}$$

Using the Mahalanobis Distance as an anomaly detector is prone to errors without guidance. Recently, Lin et al. [12] showed that the success of Mahalanobis Distance as an anomaly detector depends on whether the dimensions inspected are correlated or not. When the dimensions are indeed correlated, a larger Mahalanobis Distance can better indicate point, contextual or collective anomalies. However, the same effect occurs when uncorrelated dimensions are selected. When the dimensions are not correlated, it is more probable that a given nominal input point will differ from the observed nominal points in those dimensions, exactly as in contextual anomaly. This can cause the return of large Mahalanobis Distance and the generating of too many false alarms.

Therefore, it is imperative to use a training process prior to the usage of the Mahalanobis Distance. This process finds and groups correlated attributes, after which the Mahalanobis Distance is applied per each correlated group (also "set") of attributes. Instead of regarding $\vec{i}_t$ as one n-dimensional point and use one measurement of Mahalanobis Distance against H, multiple measurements may be applied, one per each correlated set.

The training process and how it is applied online will now be discussed. Finding correlated attributes automatically is normally not a trivial task. Some attributes may be constantly correlated to more than one attribute, while values of other attributes may be dynamically correlated to other attributes based on the characteristics of the data. For example, the front/back positional value of an aircraft's control column (such as a yoke or stick) is normally correlated, at least partially, to the aircraft's pitch and to the change of altitude, shown on its vertical speed indicator. However, this is only true depending on the value of the roll attribute, which is influenced by the aileron value of the aircraft's control column. As the aircraft is being rolled away from leveled flight, the pitch begins to influence the heading change, while reducing its influence on the vertical speed. Namely, this makes the vertical speed value correlate at least partially to the heading change, rather than the pitch. This example demonstrates how correlation between attributes can change during operation of a robot. Thus, it is apparent that an online training is needed to find dynamic correlations between the attributes.

FIGS. 3A, 3B and 3C show visualizations of three correlation matrices, each depicting the correlation strength between attributes $a_i$ (the Y-Axis) and $a_j$ (the X-axis). A black dot or area resembles a correlation. These figures are of three snapshots taken at three different times during a simulated flight, where 71 attributes were monitored. The correlation differences at these different points in time are apparent.

A fast online trainer, denoted here as Online_Trainer(H), may be used for the training in present embodiments. Based on the data of the sliding window H, the online trainer returns n sets of dynamically-correlated attributes, denoted as $CS = \{CS_1, CS_2, \ldots, CS_n\}$, and a threshold per each set, denoted as $TS = \{threshold_1, \ldots, threshold_n\}$.

The online trainer may carry out a number of procedures. The first is a correlation detector, laid out schematically in Algorithm 1 below, which is optionally based on Pearson correlation coefficient calculation. Formally, the Pearson correlation coefficient between given two vectors $\vec{X}$ and $\vec{Y}$ with averages $\bar{x}$ and $\bar{y}$, is defined as:

$$\rho = \frac{\sum_i (x_i - \bar{x})(y_i - \bar{y})}{\sqrt{\sum_i (x_i - \bar{x})^2 \sum_i (y_i - \bar{y})^2}}$$

and ranges between [−1, 1], where 1 represents a strong positive correlation, and −1 represents a strong negative correlation. Values closer to 0 indicate little or no correlation.

---

Algorithm 1 Correlation_Detector(H)

```
for each a_i ∈ A do
    CS_i ← φ
    for each a_j ∈ A do
        if |ρ_{i,j}(H_i^T, H_j^T)| > ct then
            add a_j to CS_i
    add CS_i to CS
return CS
```

Algorithm 1 returns the n sets of correlated attributes, one per each attribute $a_i \in A$. Each $CS_i$ contains the indices of the other attributes that are correlated to $a_i$. The calculation may be done as follows. The vectors of the last m values of each two attributes $a_i$, $a_j$ are extracted from $H_i^T$ and denoted $H_j^T$. The Pearson correlation is then applied to them, and denoted as $\rho_{i,j}$. If the absolute result $|\rho_{i,j}|$ is larger than a correlation threshold parameter $ct \in \{0.1\}$, then the attributes are declared correlated and $a_j$ is added to $CS_i$.

The ct parameter governs the size of the correlated attributes set. On the one hand, the higher ct is, less attributes are deemed correlated, thereby decreasing the dimensions and the total amount of calculations. However, this may also prevent attributes from being deemed correlated and affect the flagging of anomalies. On the other hand, the smaller the ct, more attributes are considered correlated, thereby increasing the dimensions, and also increasing the likelihood of false positives, as less correlated attributes are selected.

The second procedure which may be carried out by the online trainer sets a threshold value per each correlated set. These thresholds are later used by the Anomaly Detector (see Algorithm 2, below) to declare an anomaly if a detected deviation is too high, namely—the anomaly score of a given input exceeds a threshold value. Each threshold$_a \in TS$ may be set, for example, to be the highest Mahalanobis Distance of points with dimensions relating the attributes in $CS_a$ extracted from H. Since every point in H is considered nominal, then any higher Mahalanobis Distance indicates an anomaly. Alternatively, the threshold may be set to be somewhat larger or smaller than that highest Mahalanobis Distance, in order to decrease or increase, respectively, the sensitivity of anomaly declaration. For example, the threshold may be set to a few or a few dozen percent above or below the highest Mahalanobis Distance.

Monitoring in the domains of autonomous or semi-autonomous robots has a number of special characteristics, emerging from the fact that monitoring is based on data obtained from sensors that are at least partially used to provide feedback as to the robot's interaction with the environment. In other words, the expectations to see changes in the environment are a function of the actions selected by the robot.

Therefore, present embodiments take an advantageous approach of monitoring the change in the values (or their "behavior trend") measured by the sensors, which is at least partially a result of the robot's actions, rather than the absolute, raw values. Formally, the difference between, for example, the last two samples of each attribute, denoted as $\Delta(\vec{i}_t) = \vec{i}_t - \vec{i}_{t-1}$, is used. However, it should be noted that the raw readings of the sensors do not necessarily correspond directly to the robot's actions. For example, in a UAV flying straight and level, a reduction in pitch causes, and is correlated to, a descent and an increase in speed. This, of course, does not mean that any specific speed value correlates with a certain specific altitude value or pitch value.

Figure 4:
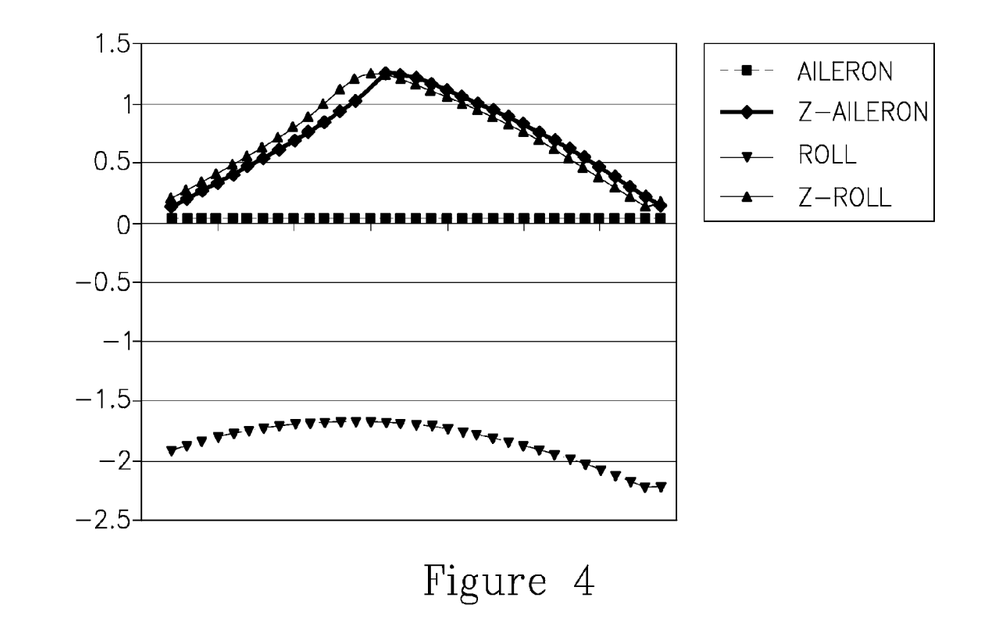
FIG. 4 shows a graph illustrating the Z-transformation technique.

To eliminate false positives caused by the uncertainty inherent to many of the sensor readings, and to facilitate the reasoning about the relative values of attributes, a smoothing (or "normalization") function, for example using a Z-transform, may be applied. This filter, the Z-transform, measures changes in terms of standard deviations (based on the sliding window) and normalizes all values to using the same standard deviation units. A Z-score is calculated for a value x and a vector $\vec{x}$ using the vector's mean value $\bar{x}$ and its standard deviation $\sigma_x$, that is, $$Z(x, \vec{x}) = \frac{x - \bar{x}}{\sigma_x}.$$

Each value $i_{t,j}$ may then be transformed to its Z-score based on the last m values extracted from the sliding window $H = H_j^T$. Formally, the transformation may be presented as $Z_{raw}(\vec{i}_t) = \{Z(i_{t,1}, H_1^T), \ldots, Z(i_{t,n}, H_n^T)\}$. This transformation on the differential data may be formalized as $Z_\Delta(\vec{i}_t) = Z_{raw}(\Delta(\vec{i}_t))$.

Two exemplary aspects emphasize the need to use a filter. First, the live feed of data from the sensors is many times noisy. Had only the last two samples been used, the noise could have significantly damage the quality of the differential data. Second, the data feed is oftentimes received at a high frequency. When the frequency of the incoming data is greater than the rate of the change in an attribute, the differential values may sometimes equal zero. Therefore, a filter that slows the change in that data, and takes into account its continuity, may, advantageously, be applied. In the experiments discussed below, two types of filters that use the aforementioned Z-transformations have been experimented with: $Z_{raw}$ and $Z_\Delta$.

When a sensor is idle, its Z-values are all 0's, since each incoming raw value is the same as the last m raw values. However, as the sensor's reading changes, the raw values become increasingly different from one another, increasing the sensor's Z-values, up until the sensor is idle again (possibly on a different raw value). The last m raw values are filled again with constant values, lowering the actuator's Z-values. This way, a change is modeled by a "ripple effect" behavior, causing other attributes that correspond to the same changes to also be affected by that effect. A deviation from this sort of trend, where the deviation exceeds a predetermined magnitude, may imply that an anomaly has occurred.

FIG. 4 illustrates the Z-transformation technique. The data presented in this figure is taken from a segment of a simulated flight. The figure presents values of attributes (Y Axis) through time (X axis). The aileron attribute stores the left and right movements of the aircraft's control column. These movements control the aircraft's roll, which is sensed using one or more gyros and stored in the roll attribute. One may say that the aileron and roll attributes are correlated if they share the same or a similar pattern of change. The ailerons' raw data, as shown in FIG. 4, remains almost constant. Yet, the roll's raw data differs significantly from the aileron's data. However, they share a very similar ripple effect, observable only in their Z-transformation values. Thus, the present Pearson calculation technique may find this correlation quite conveniently. Other attributes that otherwise could be mistakenly considered correlated when using just the raw data or $\Delta$ technique, will not be considered as such when using the Z-transformation technique, unless they both share a similar ripple effect. This may explain the fact that the present $Z_\Delta$ technique was proven, in the experiments, described below, to excel at minimizing the number of false positives.

Algorithm 2 lists how the exemplary Anomaly Detector works. Each input vector that is obtained online, $\vec{i}_t$, is transformed to $Z_\Delta(\vec{i}_t)$. The sliding window H is updated. The online trainer process retrieves the sets of correlated attributes and their thresholds. For each correlated set, only the relating dimensions are considered when comparing the point extracted from $\vec{i}_t$ to the points with the same dimensions in H. These points are compared using Mahalanobis Distance. If the distance is larger than the correlated sets' threshold, then an anomaly is declared.

Algorithm 2 Anomaly_Detector($\vec{i}_t$)

$\vec{i}_t \leftarrow Z_\Delta(\vec{i}_t)$
$H \leftarrow \{\vec{i}_{t-m-1}, \ldots, \vec{i}_{t-1}\}$
CS, TS $\leftarrow$ Online_Trainer(H)
fo each a ($0 \leq a \leq |CS|$) do
    Let $CS_a$ be the a'th set of correlated attributes in CS
    Let threshold$_a$ be the a'th threshold, associated with $CS_a$
    $P_H \leftarrow$ points with dimensions relating to $CS_a$'s attributes extracted from H
    $p_{new} \leftarrow$ point with dimensions relating to $CS_a$'s attributes extracted from $\vec{i}_t$
    if threashold$_a < D_{mahal}(p_{new}, P_H)$ then
        declare "Anomaly".

Experimental Results and Examples

First, the experimental setup is discussed, and so do the test domains and anomalies, the different anomaly detectors that emphasize the need for each of the features of present embodiments, and how scoring is done. Then, the influence of each feature of the approach of present embodiments is evaluated, including how it may outperform some prior anomaly detection approaches.

Three domains to test present embodiments have been used, as described in Table 1.

TABLE 1

Tested domains and their characteristics

| Domain | UAV | UGV | FlightGear |
|---|---|---|---|
| Data | Real | Real | Simulated |
| Anomalies | Simulated | Real | Simulated |
| Scenarios | 2 | 2 | 15 |
| Scenario duration (seconds) | 2100 | 96 | 660 |
| Attributes | 55 | 25 | 23 |
| Frequency | 4 Hz | 10 Hz | 4 Hz |
| Anomalies per scenario | 1 | 1 | 4 to 6 |
| Anomaly duration (seconds) | 64 and 100 | 30 | 35 |

The first domain is a commercial UAV. The data of two real flights, with simulated faults, was provided by the manufacturer. The fault of the first flight is a gradually decreasing value of one attribute. The fault of the second flight is an attribute that froze on a legitimate value. This fault is specially challenging, because it is associated with an attribute that is not correlated to any others.

Figure 5:
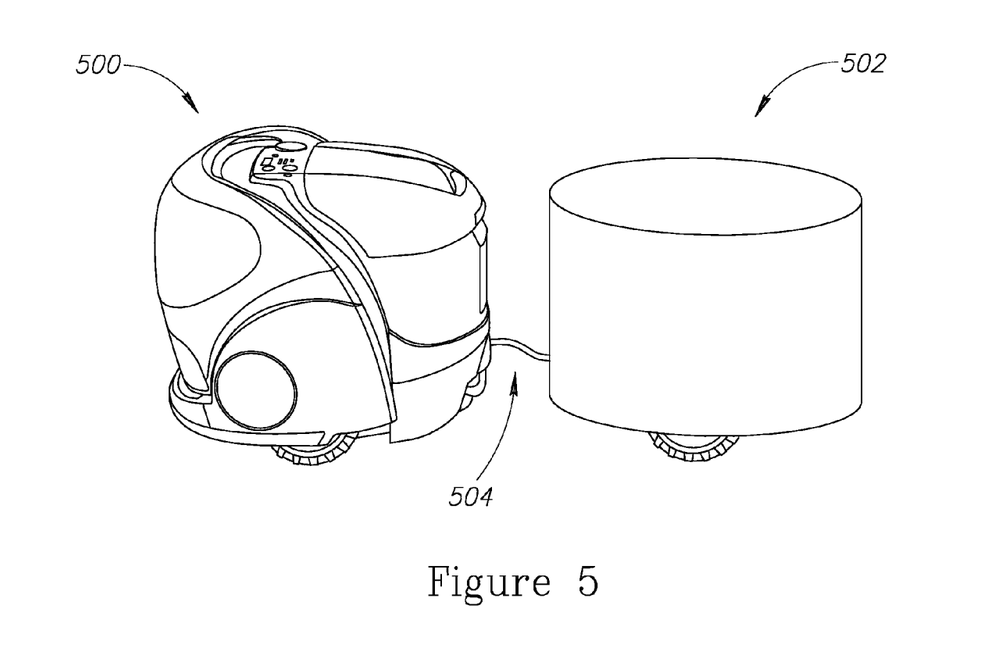
FIG. 5 shows an experimental setting with an RV400 robot towing a cart.

The second domain is a UGV. RobotsandRelax, Inc.'s RV400 robot, shown at 500 in FIG. 5, was used. This robot is equipped with ten sonars, four bumpers and odometry measures. Two scenarios were tested. In each scenario the robot travelled straight, yet it was tangled with a string 504 that was connected to a cart 502 with weight. The extra weight caused the robot to slow down in the first scenario, and completely stop in the second scenario. These scenarios demonstrate anomalies that are a result of physical objects which are not sensed by the robot. Therefore, the robot's operating program is unaware of these objects, leaving the situation unhandled. This domain also presents the challenge of detecting anomalies based only on little data (only 96 seconds of data).

To further test the present approach on more types of faults and on various conditions, a third domain, the FlightGear flight simulator, was used. FlightGear models real world behavior, and provides realistic noisy data. "Instruments that lag in real life, lag correctly in FlightGear, gyro drift is modeled correctly, the magnetic compass is subject to aircraft body forces." [6] Furthermore, FlightGear also accurately models many instrument and system faults, which can be injected into a flight at will. For example, "if the vacuum system fails, the HSI gyros spin down slowly with a corresponding degradation in response as well as a slowly increasing bias/error." [6]

In the FlightGear simulation, an autonomous UAV was programmed to fly according to the following behaviors: take-off, altitude maintenance, a turn, and eventually a landing. During flight, 4 to 6 faults were injected into three different components; the airspeed indicator, altimeter and the magnetic compass. The faults and their time of injection were both randomly selected. Each fault could be a contextual anomaly [4] with respect to the UAV's behavior, and a collective anomaly [4] with respect to the measurements of different instruments such as the GPS airspeed, altitude indicators and the Horizontal Situation Indicator (HSI).

The present approach, as experimented with, was based on three key features, compared to previous work mentioned below:

1. A comparison to a sliding window, rather than a complete record of past data.
2. The use of an online training process to find correlated attributes.
3. The use of differential, filtered data.

To show the independent contribution of each feature, the following anomaly detectors (or "anomaly detection algorithms") were tested, which are described by three parameters (Nominal Data, Training, Filter), as summarized in Table 2. The last line in the table, in bold text, is the approach of present embodiment, found to be very advantageous when using Z as the filter.

TABLE 2

Tested anomaly detectors

| Name | Nominal Data | Training |
|---|---|---|
| (CD, none, filter) | Complete past data | None |
| (SW, none, filter) | Sliding window | None |
| (CD, Tcd, filter) | Complete past data | Offline |
| (SW, Tcd, filter) | Sliding window | Offline |
| (SW, Tsw, filter) | Sliding window | Online |

The filter was raw, $\Delta$, $Z_{raw}$ or $Z_\Delta$, as discussed above. CD denotes the use of a Complete record of past Data. SW denotes the use of a Sliding Window.

(SW,Tsw,$Z_\Delta$), of the last line, is the anomaly detector described above, in accordance with present embodiments. (SW,Tcd,filter) uses almost the same technique; the thresholds are calculated on the data of the sliding window. However, the training is done first, offline, on a complete record of past data. With (CD,Tcd,filter), the data of the sliding window is replaced with the data of the complete past record. With (SW,none,filler) no training is done, meaning all the dimensions are used at once to compare $\vec{i}_t$ to the data of the sliding window. (CD,none,filler) uses all the dimensions to compare $\vec{i}_t$ to the data of a complete past record.

(CD,Tsw,filter) is not displayed in Table 2. This anomaly detector executes the training process on the sliding window, thus, thresholds are calculated online each time different correlated sets are returned. However, the comparison of the online input is made against a complete record of past data, thus, thresholds are calculated on the data of CD, which is considerably larger than the data of SW. Therefore, the anomaly detection of (CD,Tsw,filter) would hardly or not at all be feasible online, and hence, it is not compared to the other anomaly detectors displayed in Table 2.

The different anomaly detectors were evaluated by detection rate and false alarm rate. To this aim, four counters were defined, which are updated for every input $\vec{i}_t$. A "True Positive" (TP) score refers to the declaring (or "flagging") of an anomalous input as anomalous. A "False Negative" (FN) score refers to the flagging of an anomalous input as nominal. A "False Positive" (FP) score refers to the flagging of a nominal input as anomalous. A "True Negative" (TN) score refers to the flagging of a nominal input as nominal. Table 3 summarizes how these counters are updated.

TABLE 3

Scoring an anomaly detector

| Score | Description |
|---|---|
| TP | Counts 1 if at least one "anomalous" flagging ccurred during fault time |
| FN | Counts 1 if no "anomalous" flagging occurred during fault time |
| FP | Counts every "anomalous" flagging during nominal time |
| TN | Counts every "nominal" flagging during nominal time |

For each anomaly detection algorithm, the detection rate was calculated as $$\frac{tp}{tp + fn}$$

and the false alarm rate as $$\frac{fp}{fp + tn}.$$

An efficient anomaly detection algorithm, naturally, should maximize the detection rate and minimize the false alarm rate. The perfect algorithm, therefore, would have a detection rate of 1 and a false alarm rate of 0.

Figure 6:
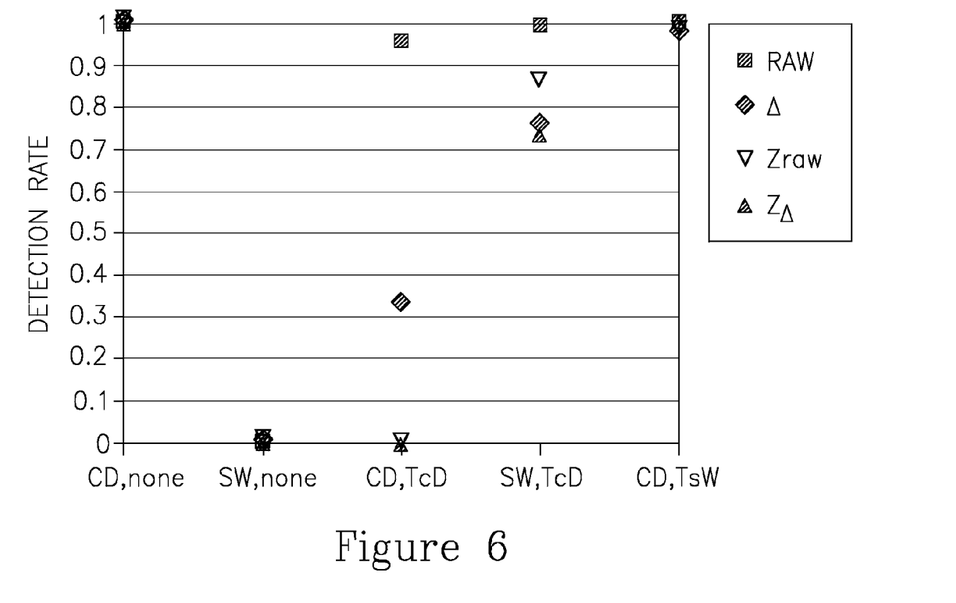
FIG. 6 shows a graph of the detection rate of 15 flights in the FlightGear simulator.
Figure 7:
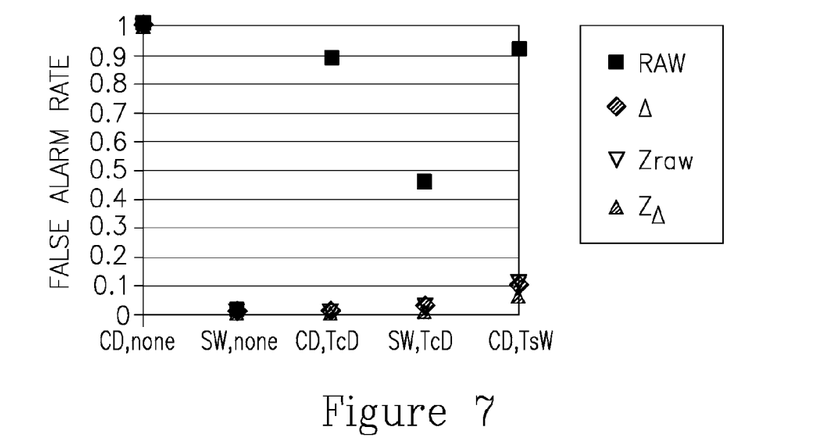
FIG. 7 shows a graph of the false alarm rate of those 15 flights.

FIGS. 6 and 7 present the detection rate and the false alarm rate, respectively, of 15 flights in the FlightGear simulator. The influence of the different filters on the different algorithms is presented. The scale ranges from 0 to 1, where 0 is the best possible score for a false alarm rate (FIG. 7) and 1 is the best possible score for a detection rate (FIG. 6).

With the first anomaly detector, (CD,none), both FIGS. 6 and 7 show a value of 1, indicating a constant declaration of an anomaly. In this case, no improvement is achieved by any of the filters. This accounted for the fact that the comparison is made to a complete record of past data. Since the new point is sampled from a different flight, it is very unlikely for it be observed in the past data, resulting with a higher Mahalanobis Distance than the threshold, and the declaration of an anomaly.

The next anomaly detector examined is (SW,none). In this detector, the comparison is made to the sliding window. Since data is collected at a high frequency, the values of $\vec{i}_t$ and the values of each vector in H are very similar. Therefore, the Mahalanobis Distance of $\vec{i}_t$ is not very different than the Mahalanobis Distance of any vector in H. Therefore, the threshold is very rarely crossed. This explains the very low false alarm rate for this algorithm in FIG. 7. However, the threshold is not crossed even when anomalies occur, resulting in a very low detection rate, as FIG. 6 shows. The reason is the absence of training. The Mahalanobis Distance of a contextual or a collective anomaly is not higher than Mahalanobis Distances of points with uncorrelated dimensions in H. The anomalies are not conspicuous enough.

The next two anomaly detectors introduce the use of offline training. The first, (CD,Tcd), uses a complete record of past data, while the second, (SW,Tcd), uses a sliding window. However, in both anomaly detectors the training is done offline, on a complete record of past data. When no filter is used, (CD,Tcd) declares an anomaly most of the times, as illustrated in FIGS. 6 and 7. When filters are used, more false negatives occur, expressed in the almost 0 false alarm rates and the decreasing of the detection rate. However, when a sliding window is used, even with no filters, (SW,Tcd) got better results, a detection rate of 1, and less than a 0.5 false alarm rate, which is lower than (CD,Tcd)'s false alarm rate. The filters used with (SW,Tcd) lower the false alarm rate to almost 0, but this time, the detection rate, though decreased, remains high. Comparing (SW,Tcd) to (CD,Tcd) shows the importance of a sliding window, while comparing (SW,Tcd) to (SW,none) shows the crucial need for training.

The final anomaly detector is (SW,Tsw), which differs from (SW,Tcd) by the training mechanism. (SW,Tsw) applies online training to the sliding window. This allows achieving a very high detection rate. Each filter used allows increasing the detection rate closer to 1, until Z gets the score of 1. The false alarm rate is very high when no filter is used. When using filters according to present embodiments, the false alarm rate may be reduced to nearly 0; (SW,Tsw,$Z_A$), which is the approach of present embodiments, achieves, surprisingly, a detection rate of 1, and a low false alarm rate of 0.064.

The results show the main contributions of each feature, summarized in Table 4. In present embodiments, each feature may be used individually or in combination with any other feature or features.

TABLE 4

Feature contribution

| Feature | Contribution | Reason |
|---|---|---|
| Sliding window | Decreases FP | Similarity of $\vec{i}_t$ to H |
| Training | Increases TP | Correlated dimensions → more conspicuous anomalies |
| Online training | Increases TP | Correspondence to dynamic correlation changes |
| Filters | Decreases FP; Increases TP | Better correlations are found |

Figure 8:
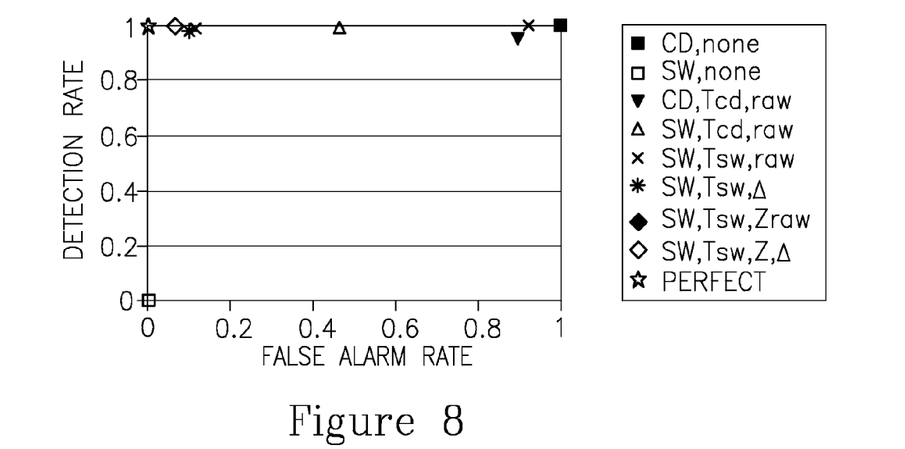
FIG. 8 shows a graph of the detection rate and false alarm rate of different anomaly detectors.
Figure 9:
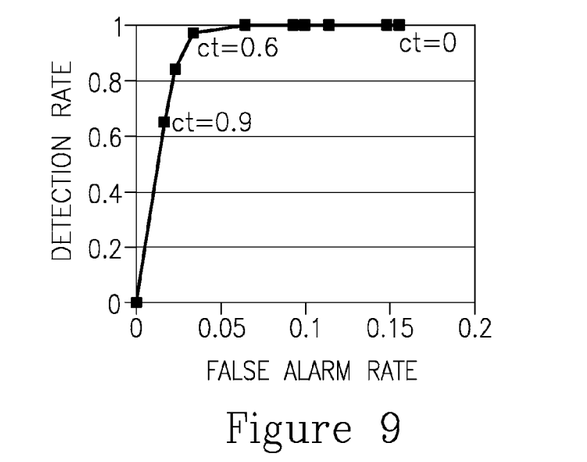
FIG. 9 shows a graph of the detection rate, false alarm rate and correlation threshold of an anomaly detector of present embodiments.

FIG. 8 shows the entire range of anomaly detectors: the X-axis is the false alarm rate and the Y-axis is the detection rate. An anomaly detector is expressed as a two-dimensional point. The perfect anomaly detector is located at point (0,1), that is, it has no false positives, and detects all the anomalies which occur. FIG. 9 illustrates that when one or more features of the approach of present embodiments is applied, it allows the results to approximate a "perfect" detector.

FIG. 9 shows the detection rates and false alarm rates of (TW,Tsw, $Z_A$) in the range of anomaly detectors, when the correlation threshold ct ∈{0.1} in the online trainer discussed above was increased. Note that the X axis scales differently than in FIG. 8; it ranges between [0, 0.2] in order to zoom-in on the effect. When ct equals 0, all the attributes are selected for each correlated set, resulting in false alarms. As ct increases, less uncorrelated attributes are selected, reducing the false alarms, until a peak is reached. The average peak of the 15 FlightGear's flights was reached when ct equaled 0.5. (TW,Tsw,$Z_A$) averaged a detection rate of 1, and a false alarm rate of 0.064. As ct was increased above that peak, less attributes that are crucial for the detection of an anomaly were selected, thereby increasing the false negatives, which in return lowers the detection rate. When ct reaches 1, no attributes are selected, resulting in a constant false negative.

Figure 10:
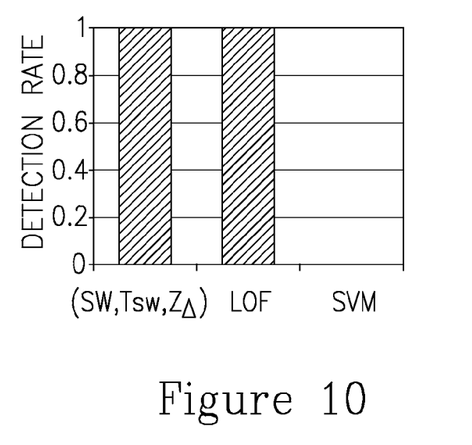
FIG. 10 shows a graph of the detection rate of different anomaly detectors.
Figure 11:
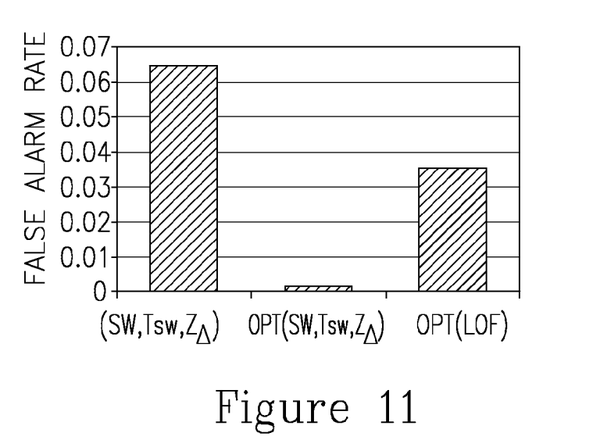
FIGS. 11, 12, 13 and 14 show graphs of the false alarm rate of different anomaly detectors.
Figure 12:
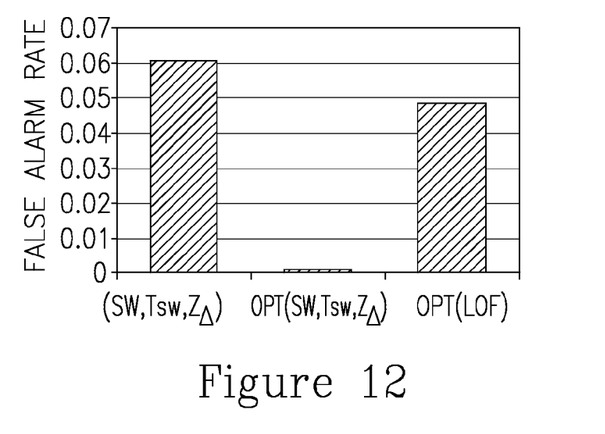

To further test the approach of present embodiments, it was compared to other existing methods. Support Vector Machines (SVM) are considered as very successful classifiers (anomaly detectors, in the present case) when examples of all categories are provided [17]. However, the SVM algorithm classifies every input as nominal, including all anomalies, resulting in a detection rate of 0, as FIG. 10 shows. Samples of both categories are provided to the SVM, and although it is an offline process, the contextual and collective anomalies were undetected. This goes to show how illusive these anomalies might be—they were undetected by a successful and well-known classifier, even under unrealistic favoring conditions.

The quality of (SW,Tsw, $Z_A$) was also examined in the context of other anomaly detectors. It was compared to the incremental LOF algorithm [15]. As in the present approach, the incremental LOF returns a density-based anomaly score in an online fashion. The incremental LOF uses a K nearest neighbor technique to compare the density of the input's "neighborhood" against the average density of the nominal observations [15]. FIG. 10 shows a detection rate of 1 by both (SW,Tsw,$Z_A$) and the incremental LOF algorithm, making LOF much better than SVM.

Since the incremental LOF returns an anomaly score rather than an anomaly label, it was necessary to compare the two approaches using an offline optimizer algorithm that gets the anomaly scores returned by an anomaly detector, as well as the anomaly times, and returns the optimal thresholds. In retrospect, these optimal thresholds would have been utilized by the anomaly detector to label the anomalies, in a way that all anomalies would have been detected with a minimum of false positives.

FIGS. 11 to 14 show, for every tested domain, the false alarm rate of:
1. (SW,Tsw,$Z_A$).
2. Optimized (SW,Tsw,$Z_A$), denoted as OPT(SW,Tsw,$Z_A$).
3. Optimized incremental LOF, denoted as OPT(LOF).

The results of the detection rate for these three anomaly detectors is 1 in every tested domain, just like the perfect classifier; all anomalies are detected. Thus, the false alarm rate presented, also expresses the distance to the "perfect" classifier, where 0 is perfect.

The comparison between (SW,Tsw,$Z_A$) to OPT(LOF) does not indicate which approach is better in anomaly detection, since the incremental LOF is optimized, meaning, the best theoretical results it can get are displayed. However, the comparison between OPT(SW,Tsw, $Z_A$) to OPT(LOF) does allow comparison, since both detectors are optimized. The comparison between OPT(SW,Tsw, $Z_A$) to (SW,Tsw, $Z_A$) indicates how better (SW,Tsw,$Z_A$) can get.

Figure 13:
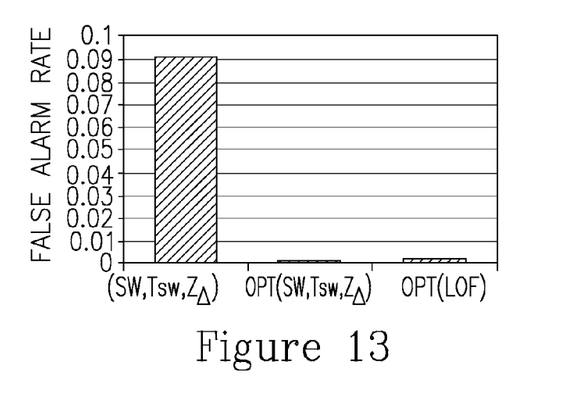

In all the domains, the OPT(SW,Tsw,$Z_A$) had the lowest false alarm rate. Naturally, OPT(SW,Tsw, $Z_A$) has a lower false alarm rate than (SW,Tsw, $Z_A$), but more significantly, it had a lower false alarm rate than OPT(LOF), making the approach of the present embodiments a better anomaly detector than the incremental LOF algorithm. Of all the tested domains, the highest false alarm rate of (SW,Tsw, $Z_A$) occurred in the UAV's second flight, as FIG. 13 shows (little above 0.09). In this flight, the fault occurred in an attribute that is not very much correlated to any other. Thus, the correlation threshold (ct) had to be lowered. This allowed the existence of a correlated set that includes the faulty attribute as well as other attributes. This led to the detection of the anomaly. However, the addition of uncorrelated attributes increased the false alarm rate as well.

Figure 14:
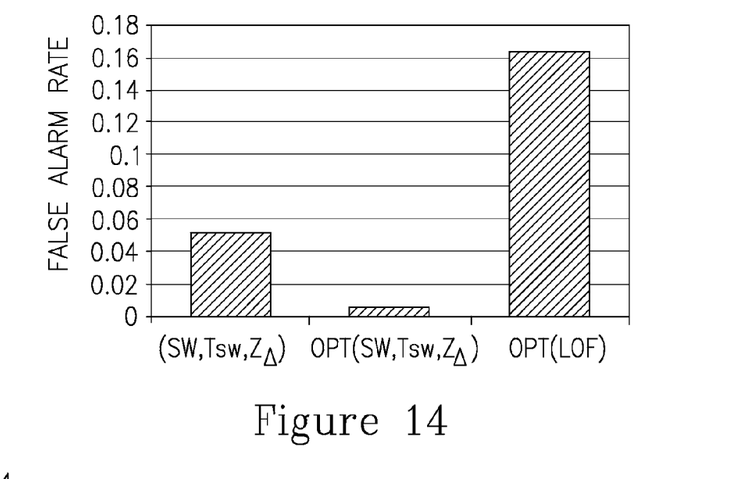

FIG. 14 shows a surprising result. Even though the results of the incremental LOF are optimized, (SW,Tsw,$Z_A$), which is not optimized, had a lower false alarm rate. This is explained by the fact that in the UGV domain, there was very little data. KNN approaches usually fail when nominal or anomalous instances do not have enough close neighbors [4]. This domain simply did not provide the LOF calculation enough data to accurately detect anomalies. However, the Mahalanobis Distance uses all those points in the distribution having enough data to properly detect the anomalies.

Figure 15:
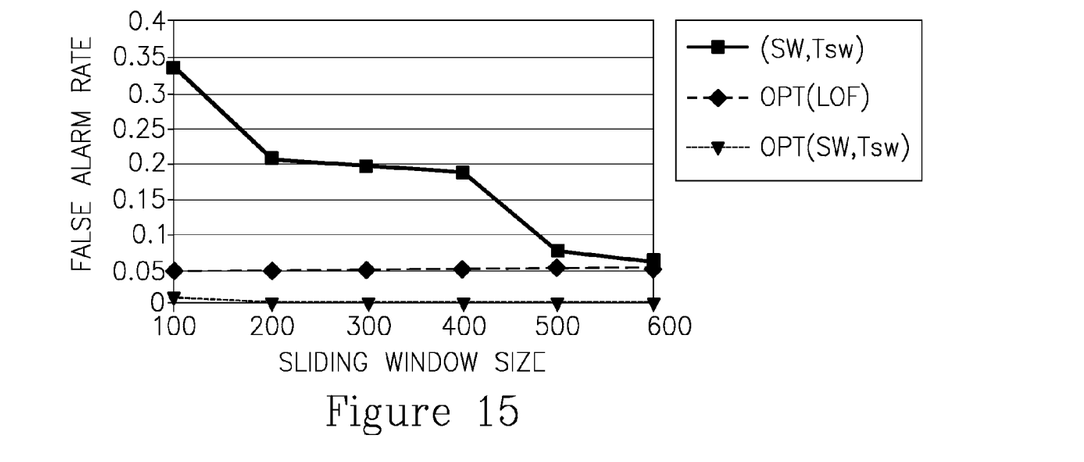
FIG. 15 shows a graph of the false alarm rate as a function of the sliding window size, in three different anomaly detectors.

FIG. 15 shows the false alarm rate influenced by the increase of the sliding window's size. While Mahalanobis Distance uses the distribution of all the points in the sliding window, the KNN uses only a neighborhood within the window, thus unaffected by its size. Therefore, there exists a size upon which the real false alarm rate of the present approach meets the incremental, optimized false alarm rate of LOF.

An unsupervised, model-free, online anomaly detector was described above. The detector showed, experimentally, an advantageous ability to detect anomalies while minimizing false alarms. Moreover, the features of the sliding window, the online training and the filtered differential data, or at least part thereof, made the difference between having an unusable anomaly detector and an anomaly detector that is better than the existing methods experimented with, when applied to robots.

In the description and claims of the application, each of the words "comprise" "include" and "have", and forms thereof, are not necessarily limited to members in a list with which the words may be associated.

REFERENCES

[1] N. Agmon, S. Kraus, and G. A. Kaminka. Multi-robot perimeter patrol in adversarial settings. In ICRA, pages 2339-2345, 2008.
[2] A. Birk and S. Carpin. Rescue robotics—a crucial milestone on the road to autonomous systems. Advanced Robotics Journal, 20(5), 2006.
[3] T. Brotherton and R. Mackey. Anomaly detector fusion processing for advanced military aircraft. In IEEE Proceedings on Aerospace Conference, pages 3125-3137, 2001.
[4] V. Chandola, A. Banerjee, and V. Kumar. Anomaly detection: A survey. ACM Comput. Surv., 41(3):1-58, 2009.
[5] L. Cork and R. Walker. Sensor fault detection for UAVs using a nonlinear dynamic model and the IMM-UKF algorithm. IDC, pages 230-235, 2007.
[6] FlightGear. Website, 2010. http://www.flightgear.org/introduction.html.
[7] FlightGear in Research. Website, 2010. http://www.flightgear.org/Projects/.
[8] P. Goel, G. Dedeoglu, S. I. Roumeliotis, and G. S. Sukhatme. Fault-detection and identification in a mobile robot using multiple model estimation and neural network. In ICRA, 2000.
[9] M. A. Goodrich, B. S. Morse, D. Gerhardt, J. L. Cooper, M. Quigley, J. A. Adams, and C. Humphrey. Supporting wilderness search and rescue using a camera-equipped mini UAV. Journal of Field Robotics, pages 89-110, 2008.

[10] R. M. J. Craighead and B. G. J. Burke. A survey of commercial open source unmanned vehicle simulators. In ICRA, pages 852-857, 2007.
[11] J. Laurikkala, M. Juhola, and E. Kentala. Informal identification of outliers in medical data. In Fifth International Workshop on Intelligent Data Analysis in Medicine and Pharmacology. 2000.
[12] R. Lin, E. Khalastchi, and G. A. Kaminka. Detecting anomalies in unmanned vehicles using the mahalanobis distance. In ICRA, pages 3038-3044, 2010.
[13] P. C. Mahalanobis. On the generalized distance in statistics. In Proceedings of the National Institute of Science, pages 49-55, 1936.
[14] T. Oates, M. D. Schmill, D. E. Gregory, and P. R. Cohen. Learning from Data: Artificial Intelligence and Statistics, chapter Detecting Complex Dependencies in Categorical Data, pages 185-195. Springer Verlag, 1995.
[15] D. Pokrajac. Incremental local outlier detection for data streams. In IEEE Symposium on Computational Intelligence and Data Mining., 2007.
[16] E. F. Sorton and S. Hammaker. Simulated flight testing of an autonomous unmanned aerial vehicle using flight-gear. AIAA 2005-7083, Institute for Scientific Research, Fairmont, W. Va., USA, 2005.
[17] Steinwart and A. Christmann. Support Vector Machines. Springer-Verlag, 2008.
[18] P. Sundvall and P. Jensfelt. Fault detection for mobile robots using redundant positioning systems. In ICRA, pages 3781-3786, 2006.
[19] S. Thrun. Robotic mapping: A survey. In Exploring Artificial Intelligence in the New Millenium, pages 1-35. Morgan Kaufmann, 2003.

What is claimed is:

1. A method for detecting an anomaly in operation of a data analysis device, the method comprising using at least one processor for:
   receiving present real-time readings of multiple sensors associated with the data analysis device, and maintaining a history of past real-time readings;
   determining which of said multiple sensors are correlated;
   computing a deviation between at least some of said present and at least some of said past real-time readings of said correlated sensors; and
   declaring an anomaly when said deviation exceeds a predetermined threshold;
   wherein said deviation comprises a Mahalanobis distance.

2. A method for detecting an anomaly in operation of a data analysis device, the method comprising using at least one processor for:
   receiving present real-time readings of multiple sensors associated with the data analysis device, and maintaining a history of past real-time readings;
   determining which of said multiple sensors are correlated;
   computing a deviation between at least some of said present and at least some of said past real-time readings of said correlated sensors; and
   declaring an anomaly when said deviation exceeds a predetermined threshold;
   wherein said determining which of said multiple sensors are correlated comprises calculating a Pearson correlation between said present and said past real-time readings of said multiple sensors.

3. The method according to claim 2, further comprising using said at least one processor for adjusting a threshold of said Pearson correlation, to trade-off between anomaly detection rate and false positive anomaly declarations.

4. A method for detecting an anomaly in operation of a data analysis device, the method comprising using at least one processor for:
   receiving present real-time readings of multiple sensors associated with the data analysis device, and maintaining a history of past real-time readings;
   determining which of said multiple sensors are correlated;
   computing a deviation between at least some of said present and at least some of said past real-time readings of said correlated sensors; and
   declaring an anomaly when said deviation exceeds a predetermined threshold; and
   further comprising using said at least one processor for applying a normalization function to said past real-time readings;
   wherein said normalization function comprises a Z-transformation.

5. A data analysis device comprising multiple sensors, a processor and a memory, wherein said processor is configured to:
   receive present real-time readings from said multiple sensors, and maintain, in said memory, a history of past real-time readings;
   determine which of said multiple sensors are correlated;
   compute a deviation between at least some of said present and at least some of said past real-time readings of said correlated sensors; and
   declare an anomaly when said deviation exceeds a predetermined threshold; and
   further comprising a platform selected from the group consisting of: a robot, a medical device, an intrusion detection system, a fraud detection system and an image processing system.

6. A data analysis device comprising multiple sensors, a processor and a memory, wherein said processor is configured to:
   receive present real-time readings from said multiple sensors, and maintain, in said memory, a history of past real-time readings;
   determine which of said multiple sensors are correlated;
   compute a deviation between at least some of said present and at least some of said past real-time readings of said correlated sensors; and
   declare an anomaly when said deviation exceeds a predetermined threshold;
   wherein said deviation comprises a Mahalanobis distance.

7. A data analysis device comprising multiple sensors, a processor and a memory, wherein said processor is configured to:
   receive present real-time readings from said multiple sensors, and maintain, in said memory, a history of past real-time readings;
   determine which of said multiple sensors are correlated;
   compute a deviation between at least some of said present and at least some of said past real-time readings of said correlated sensors; and
   declare an anomaly when said deviation exceeds a predetermined threshold;
   wherein determine which of said multiple sensors are correlated comprises calculating, by said processor, a Pearson correlation between said present and said past real-time readings of said multiple sensors.

8. The data analysis device according to claim 7, wherein said processor is further configured to adjust a threshold of said Pearson correlation, to trade-off between anomaly detection rate and false positive anomaly declarations.

9. A data analysis device comprising multiple sensors, a processor and a memory, wherein said processor is configured to:
- receive present real-time readings from said multiple sensors, and maintain, in said memory, a history of past real-time readings;
- determine which of said multiple sensors are correlated;
- compute a deviation between at least some of said present and at least some of said past real-time readings of said correlated sensors; and
- declare an anomaly when said deviation exceeds a predetermined threshold;
- wherein said processor is further configured to apply a normalization function to said past real-time readings, and said normalization function comprises a Z-transformation.

10. A method for online detection of an anomaly in operation of a data analysis device, the method comprising analyzing a behavior trend of multiple sensors of the device, and declaring an anomaly when a change of a predetermined magnitude in said behavior trend is detected; wherein said analyzing of said behavior trend comprises computing a Mahalanobis distance between consecutive readings of said multiple sensors.

11. A method for online detection of an anomaly in operation of a data analysis device, the method comprising analyzing a behavior trend of multiple sensors of the device, and declaring an anomaly when a change of a predetermined magnitude in said behavior trend is detected; wherein said multiple sensors are correlated sensors selected from a larger plurality of sensors of the device; and further comprising calculating a Pearson correlation between consecutive readings of said larger plurality of sensors of the device, to select said correlated sensors.

12. A method for online detection of an anomaly in operation of a data analysis device, the method comprising analyzing a behavior trend of multiple sensors of the device, and declaring an anomaly when a change of a predetermined magnitude in said behavior trend is detected; wherein said multiple sensors are correlated sensors selected from a larger plurality of sensors of the device; and further comprising adjusting a threshold of said Pearson correlation, to trade-off between anomaly detection rate and false positive anomaly declarations.

* * * * *